UNITED STATES PATENT OFFICE.

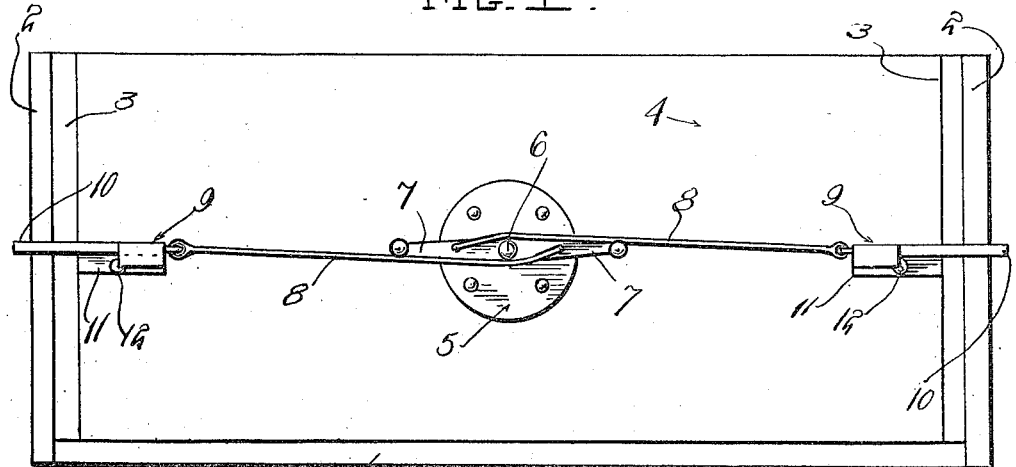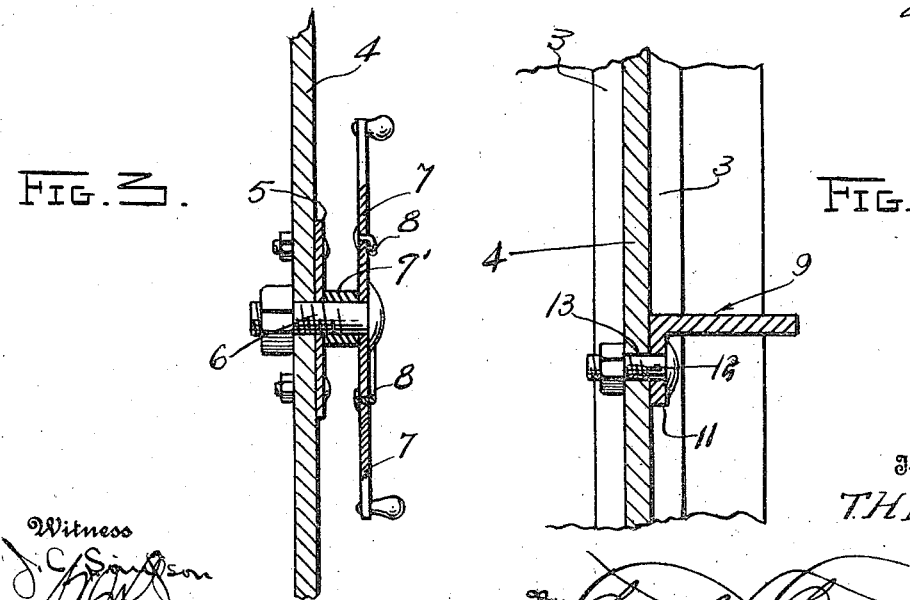

THOMAS H. EATON, OF KEYSPORT, ILLINOIS.

END-GATE FASTENER.

1,268,943.  Specification of Letters Patent.  Patented June 11, 1918.

Application filed August 28, 1916. Serial No. 117,311.

*To all whom it may concern:*

Be it known that I, THOMAS H. EATON, a citizen of the United States, residing at Keysport, in the county of Clinton, State of Illinois, have invented certain new and useful Improvements in End-Gate Fasteners; and I do hereby declare the following to be a full, clear, and exact description of the invention, such as will enable others skilled in the art to which it appertains to make and use the same.

The present invention is directed to improvements in end gate fasteners, and has for its object to provide a device of this character constructed in such a manner that the end gate can be easily removed and replaced, and when in place can be firmly locked.

A further object of the invention is to provide a device of this character so constructed that a person can upon shifting of a single lever simultaneously operate the securing clips to cause the same to engage or disengage the sideboards of the wagon body.

With these and other objects in view, this invention resides in the novel features of construction, formation, combination and arrangement of parts to be hereinafter more fully described, claimed and illustrated in the accompanying drawing, in which:

Figure 1 is a rear elevation of an end gate showing the same equipped with the device.

Fig. 2 is a top plan view.

Fig. 3 is a section view on the line 3—3 of Fig. 1.

Fig. 4 is a sectional view on line 4—4 of Fig. 2.

Referring to the drawing 1 indicates the wagon body having the usual sideboards 2, and spaced cleats 3. The end gate 4 has connected thereto a disk 5, said disk having a central horizontally disposed pin 6 which is pivotally engaged by the central portion of the lever 7. To hold the lever 7 spaced from the disk is a sleeve 7' which is placed over the pin 6.

Having their inner ends pivotally connected to the lever 7 upon opposite sides of the pin 6 are rods 8, the outer ends of which are connected to the clips 9, said clips being formed from suitable metal and provided with hooks 10, the purpose of which will appear later.

The clips are provided with flanges 11 which have carried thereby bolts 12, said bolts being slidably engaged in the slots 13 formed in the end gate 4.

To apply the end gate the same is dropped with its ends in the spaces between the cleats 3 so that the hooks 10 will engage the ends of the sideboards 2, whereupon the lever 7 is swung to a horizontal position thereby drawing the hooks 10 in clamping engagement with the sideboards so as to hold the end gate 4 firmly in place, and against accidental displacement.

What is claimed is:—

In a wagon body, the combination of an end gate having longitudinal slots in the ends thereof adjacent the sides of the body, fastening clips each formed of a substantially flat plate disposed horizontally with respect to the end gate and projecting rearwardly therefrom, one edge of said plate having a flange abutting said end gate and provided with an opening registering with said slot, means extending through said opening and slot and engaging said flange and end gate whereby to support the fastening clip in operative position, the rear edge of the plate opposite said flange being extended to provide a hook engaging the adjacent side of the wagon body, and means secured to said end gate and connected to said plates for adjusting said hooks in clamping engagement with said sides.

In testimony whereof, I affix my signature in the presence of two witnesses.

THOMAS H. EATON.

Witnesses:
BEATRICE HENSLEY,
G. W. GUM.

Copies of this patent may be obtained for five cents each, by addressing the "Commissioner of Patents, Washington, D. C."